United States Patent [19]
Frudakis et al.

[11] Patent Number: 6,165,474
[45] Date of Patent: Dec. 26, 2000

[54] APPLICATION FOR PATENT FOR NUTRICEUTICAL CHEW TOY

[75] Inventors: Darlene A. Frudakis, Novato, Calif.; Jaime G. Lopez, Elgin, Ill.

[73] Assignee: PetAg, Inc., Hampshire, Ill.

[21] Appl. No.: 09/342,491

[22] Filed: Jun. 29, 1999

[51] Int. Cl.[7] .......................... A01N 65/00; A61K 35/78; A61K 39/385; A23K 1/18; A23K 1/65

[52] U.S. Cl. .................. 424/195.1; 424/58; 424/442; 424/520; 426/3; 426/802; 426/805; 514/783

[58] Field of Search .......................... 514/783; 424/195.1, 424/442, 58, 520; 426/3, 805, 802

[56] References Cited

U.S. PATENT DOCUMENTS

| | | |
|---|---|---|
| 2,988,045 | 6/1961 | Fisher . |
| 4,229,485 | 10/1980 | Brown et al. . |
| 4,802,444 | 2/1989 | Markham et al. . |
| 4,880,642 | 11/1989 | Berends . |
| 5,000,973 | 3/1991 | Scaglione et al. . |
| 5,011,679 | 4/1991 | Spanier et al. . |
| 5,030,463 | 7/1991 | Evans . |
| 5,094,870 | 3/1992 | Scaglione et al. . |
| 5,100,651 | 3/1992 | Boyer . |
| 5,114,704 | 5/1992 | Spanier et al. . |
| 5,149,550 | 9/1992 | Mohilef . |
| 5,263,436 | 11/1993 | Axelrod . |
| 5,310,541 | 5/1994 | Montgomery . |
| 5,476,069 | 12/1995 | Axelrod . |
| 5,477,815 | 12/1995 | O'Rourke . |
| 5,635,237 | 6/1997 | Greenberg . |
| 5,673,653 | 10/1997 | Sherrill . |
| 5,711,254 | 1/1998 | O'Rourke . |
| 5,989,604 | 11/1999 | Wolf et al. . |

OTHER PUBLICATIONS

Bauer et al., "Echinacea Species as Potential Immunostimulatory Drugs", pp. 254–321, Economic and Medicinal Plant Research, eds. Wagner et al, 1992.

Heinerman, J., Heinerman's Encyclopedia of Healing Herbs & Spices, pp. 211–213, Parker Publishing Co., Inc., 1995.

*Primary Examiner*—Leon B. Lankford, Jr.
*Assistant Examiner*—Michele Flood
*Attorney, Agent, or Firm*—Robert E. Browns; Michael G. Kelber

[57] ABSTRACT

The invention provides an improved chew toy for delivering nutrients to pets. More particularly, the invention comprises rawhide having a coating or baste comprising at least one nutriceutical substance. In one aspect of the invention, the nutriceutical substance is *Echinacea purpurea*. In another aspect of the invention, the nutriceutical substance is glucosamine HCL. In another aspect of the invention, the nutriceutical substance is Vitamin A. In another aspect of the invention, the nutriceutical substance is calcium.

6 Claims, No Drawings

APPLICATION FOR PATENT FOR NUTRICEUTICAL CHEW TOY

FIELD OF THE INVENTION

The present invention relates generally to a chew toy for animals, particularly, dogs.

BACKGROUND OF THE INVENTION

This invention relates to the field of chew toys for animals. Specifically, the invention relates to raw hide toys having an edible coating that provides desirable nutrients, such as, herbal remedies, vitamins, and/or minerals. Methods for processing rawhide into animal toys are well known in the art. It is known to make rawhide toys into a bone shape having knots on the ends or pressed, comminuted, extruded, or otherwise formed into various other shapes, such as, a lollipop, a solid bar, or a stick.

The process for making rawhide bones consists of the following steps. Animal hides, typically, those of livestock, are split and then soaked in a lime solution, which removes hair from the hide. The hides are then rinsed thoroughly with careful attention paid to removing all the lime solution. After extensive rinsing, the hide is cut and rolled and shaped into forms. Typically, the rawhide is rolled and tied on each end in the form of a bone. In the preferred embodiment, this procedure is done entirely by hand, although similar results could be obtained by machine. The formed rawhide is placed on vented, bakery-type racks and then put into a drying room. Through a natural process known as "moisture extraction," moisture is extracted from within the rawhide, enabling the rawhide to be thoroughly dried from the inside out. The moisture extraction combines warm air flow of approximately 60 degrees Celsius and dehumidification. This slow drying process takes between 2 and 5 days and prevents the raw hide from drying on the outside while retaining water in the inside, which can cause the raw hide to rot.

Patents disclose various methods and articles relating to the processing of rawhide for use as a pet chew toy. For example, U.S. Pat. No. 2,988,045, issued to Fisher on Jun. 13, 1961 (Fisher), discloses an animal toy made from rolled rawhide. A simulated animal bone is prepared by rolling a sheet of wet rawhide into a cylindrical form, and while it is still wet, placing at least one knot therein, but preferably both ends thereof, in order to simulate an animal joint, and then drying the product.

U.S. Pat. No. 4,880,642, issued to Berends on Nov. 14, 1989 (Berends), discloses a method of making chewing bones for pets. Chews for pets are made from sinews or tendons of cattle and other livestock by the method of cooking the tendons and sinews in a water for a period of 5 hours, followed by the removal of meat and fat, and then baking at a temperature of at least 200 degrees C., until they are completely or substantially completely hardened.

U.S. Pat. No. 5,149,550, issued to Mohilef on Sep. 22, 1992 (Mohilef), discloses a method for making pet chews. According to this invention, ligaments from cattle and other hoofstocks are rendered substantially free of fat. Fat from the ligaments is removed by washing them in an aqueous degreasing solution comprised of water, strong alkali and cleaning agents. The ligaments are then roasted until they turn a desired color and then further dried until the ligaments are hard and "bone-like" and suitable for pets to chew on.

U.S. Pat. No. 5,476,069, issued to Axelrod on Dec. 19, 1995 (Axelrod), discloses a molded rawhide chew toy. A rawhide-derived dog chew is provided, wherein rawhide is comminuted, melted, and then injection molded and, finally, allowed to dry. Axelrod further discloses, Col. 2, lines 39–42, that after the rawhide is comminuted, various attractants and/or certain nutrients such as, for example, vitamins, may additionally be added to the dried rawhide particles before it is injection-molded.

It is known in the art to apply a coating on rawhide chews by using a baste. Conventional baste may be used to provide desired coloring and/or flavoring or odor to make the chew toy more appealing to pets and their owners. Particular baste formulations can provide a more natural-looking color that pet owners are more inclined to purchase. For example, U.S. Pat. No. 5,673,653, issued to Sherrill on Oct. 7, 1997 (Sherrill), col. 1, lines 55–65, discloses various types of bastes applied to rawhide chew toys.

Other additives can be included in the baste to reduce odor or to provide dental care for pets by removing or preventing plaque or other deleterious build-up from the pet's teeth. Many of the disclosed chew toys are concerned with providing dental care for animals that chew on a toy. For example, U.S. Pat. No. 5,100,651 issued to Boyer on Mar. 31, 1992 (Boyer), discloses a health product for caring of the teeth of a dog, consisting of a support made from a substance consisting of an animal skin. The support has incorporated or absorbed various water soluble active elements selected from anti-decay agents consisting of sodium fluoride, a monfluoroshphosphate of sodium, or a mixture thereof.

U.S. Pat. Nos. 5,011,679 and 5,114,704 both issued to Spanier, et al., on Apr. 30, 1991 (Spanier I), and May 19, 1992, (Spanier II) respectively, disclose a rawhide having coating containing an inorganic pyrophosphate. These patents disclose a rawhide having a coating containing a tartar-control effective amount of at least one inorganic pyrophosphate compound. They further disclose a process for preparing the rawhide having the coating containing a tartar-control effective amount of at least one water soluble, alkaline metal, inorganic pyrophosphate compound, by contacting the rawhide with the compound and allowing the rawhide to dry.

U.S. Pat. No. 5,310,541, issued to Montgomery on May 10, 1994 (Montgomery), discloses an antimicrobial rawhide animal chew containing an oxidoreductase and oxidoreductase substrate. The animal chew produces hydrogen peroxide upon being chewed. The hydrogen peroxide activates the salivary peroxide system present in the saliva, which in turn produces hypothiocynite, an antimicrobial agent. The chew is preferably prepared by placing it into a substrate solution for a period, drying the chew, spraying the dried rawhide chew with a solution of oxidoreductase, and finally drying the chew again.

Nutriceutical products, including vitamins, minerals and other herbal remedies have gained wide acceptance among humans. For example, it is know that vitamins, such as Vitamin A, Vitamin B, Vitamin C, Vitamin E, etc., and other herbal remedies such as echinacea, glucosamine, St. John's Wort, etc., are taken by humans as a diet supplement and to provide health benefits such as lowering stress, fighting disease and bolstering immunity, strengthening concentration, and providing needed nutrients to the body. While some nutrients, such as vitamins, have been used as additives mixed in certain pet foods, see, for example, U.S. Pat. No. 4,229,485, issued to Brown, et al., on Oct.21, 1980 (Brown), Col. 5, Lines 56–61, it has not been taught in the art to apply these nutriceutical products in the form of a coating on a toy. To advance health care for pets, there is a need for providing nutriceutical substances in a fashion that is enjoyable for pets to ingest. The present invention satisfies the industry demands.

SUMMARY OF INVENTION

It is an object of the invention to provide an improved rawhide chew toy for delivering nutrients to pets. More particularly, it is an object of the invention's preferred embodiment to provide rawhide having a coating comprising at least one nutriceutical substance.

In another aspect of the invention, the nutriceutical substance provided on the chew toy is *Echinacea purpurea*. In another aspect of the invention, the nutriceutical substance is glucosamine HCL. In another aspect of the invention, the nutriceutical substance is Vitamin A. In another aspect of the invention, the nutriceutical substance is calcium.

The foregoing features and advantages of the present invention will be apparent from the following more detailed description of the invention. Other features and advantages of the invention will be apparent from the following detailed description and.

DETAILED DESCRIPTION OF THE INVENTION

The invention comprises a chew toy having a coating comprising at least one nutriceutical substance and the process for applying the nutriceutical substance to the chew toy. Generally, the coating is applied to the chew toy by preparing a baste solution having at least one nutriceutical substance and dipping the chew toy into the baste solution so the nutriceutical substance adheres to the chew toy as a coating.

In the preferred embodiment, one or more nutriceutical substances are mixed with water to create a baste solution. Specifically, in the preferred embodiment, the baste solution is prepared in a batch size of approximately 500 gallons, or 4,168.5 pounds. The baste solution is made by mixing approximately 70% collagen and 30% water. For a 500 gallon batch size, this equates to 2,917.95 pounds of collagen mixed with 1,250.55 pounds of water. Collagen baste is a semi-solid product, having 30% moisture content, extracted from beef cowhides. Collagen baste has a bulk density of 28 pounds per cubic-feet. The mixture of water and collagen baste is raised to the boiling point, which takes approximately 6 hours. Various combinations of substances in addition to or instead of collagen, or none, depending on which nutriceutical substance is applied, may be added to the baste to provide coloring or flavoring without departing from the invention. For example, some nutriceutical substances require a baste solution that has some adhesive quality to adhere the nutriceutical substance to the rawhide. Any known natural or synthetic adhesive, such as, a gum or psyllium, could serve this function. Other nutriceutical substances are capable of sticking to the chew toy without any adhesive.

To this baste solution, nutriceutical substances are added to provide health benefits to the pet. Nutriceutical substances may be classified as herbal remedies, vitamins, and minerals, and include the following:

| Herbal Remedies | Vitamins | Minerals |
| --- | --- | --- |
| St. Johns Wort | Vitamin A | Calcium |
| Kava Kava | Vitamin D | Phosphorus |
| Ginkgo Biloba | Vitamin E | Zinc |
| Ginsing (different geographical areas) | Vitamin K | Magnesium |

-continued

| Herbal Remedies | Vitamins | Minerals |
| --- | --- | --- |
| Catsclaw | Thiamin (B1) | Manganese |
| Camomile | Riboflavin (B2) | Iron |
| Golden Seal | Niacin | Copper |
|  | Pyridoxine (B6) |  |
|  | Panthothenic Acid |  |
|  | Biotin |  |
|  | Folic Acid |  |
|  | Vitamin B12 |  |
|  | Vitamin C (Ascorbic Acid) |  |
|  | Choline |  |

Nutriceutical substances are commonly available. For example, one source is MW International, 225 Long Ave., Hillside, N.J. 27205-2349. In one preferred embodiment, a nutriceutical substance, *Echinacea purpurea*, is added to the baste solution. Echinacea is believed to aid an animal's immune system and prevent disease. In one preferred embodiment, 6.67 pounds of *Echinacea purpurea* powder is added to the 500 gallons of baste solution. This mixture provides a final concentration of 0.16% *Echinacea purpurea* in the baste solution by weight. While this mixture concentration has been found to provide good consistency and appealing appearance, other concentrations may be used without departing from the invention, and thus the disclosed concentrations are not meant to be limiting.

In another preferred embodiment, the nutriceutical substance, glucosamine HCL, is added to the baste solution. Glucosamine is believed to help alleviate arthritic symptoms and to improve joint- and bone-related problems, especially those that older animals may experience. In the preferred embodiment, 4.16 pounds of glucosamine HCL powder is added to the 500 gallon batch of baste solution. This mixture achieves a final concentration of 0.10% of glucosamine HCL in the baste solution by weight. While this concentration is used in the preferred embodiment, other concentrations may be equally effective, and the invention is therefore not limited to this concentration.

Many other nutriceutical substances may be added to the baste solution to provide health benefits to animals. By chewing the toy, the animals ingest the beneficial nutriceutical substance. For example, calcium is another nutriceutical additive that can be introduced to the baste solution to provide animal health benefits, such as to help build stronger more healthy bones. In a preferred empodiment, approximately 4 pounds of Calcium is added to the 500 gallon batch of baste solution. The mixture achieves a final concentration of 0.10% of Calcium in the baste solution by weight. Another nutriceutical substance that could be used in the invention is Saint John's wort. Other desirable nutriceutical substances that could be applied to the baste solution are set forth above.

The process for applying the nutriceutical substance to the chew is described as follows: The dried rawhide chews are double hand dipped into a nutriceutical substance. Hand dipping, as opposed to complete immersion, is preferred to avoid accumulation of baste material inside the individual bones. Each bone is manually dipped, but not immersed, on each side and then placed on an oven rack for drying. The finished bones are dried at a temperature of 60° C. for a minimum of six hours. Some rawhide chews might require longer drying time, depending on their size. Dried chews are packaged with different presentation for distribution and sales. While the preferred embodiment is described as using a rawhide bone chew, other rawhide and natural chew toys could be substituted for a rawhide bone without departing from the invention.

According to the preferred embodiment, the various nutriceutical coatings are applied to the rawhide chew toy in such a way as to provide unique commercial appearances so that consumers can differentiate between the products. For example, the rawhide with a calcium nutriceutical additive is made to have a light brown appearance, whereas the echinacea nutriceutical additive is provided with speckles in addition to the light brown appearance. The speckles are achieved by using a echinacea product that is ground to an appropriate coarseness, so that it achieves the speckled appearance when dried on the chew toy. The glucosamine nutriceutical additive product is dried to a clear natural light color. While these processing enhancements provide benefits in marketing the invention to the public, these factors do not affect the utility of the invention and, therefore, are not limiting to the invention.

While the invention has been particularly shown and described with reference to a particular embodiment thereof, it will be understood by those skilled in the art that various changes in form and detail may be made therein without departing from the spirit and scope of the invention. The present example and embodiment, therefore, are to be considered in all respects as illustrative and not restrictive, and the invention is not to be limited to the details given herein.

We claim:

1. A chew toy comprising rawhide having a coating comprising at least one nutriceutical substance wherein the nutriceutical substance is *Echinacea purpurea*.

2. The chew toy of claim 1, wherein the coating comprises a baste solution including the nutriceutical substance.

3. The chew toy of claim 2, wherein the concentration of *Echinacea purpurea* in the baste solution is between 0.01% and 10% by weight.

4. The chew toy of claim 2, wherein the concentration of *Echinacea purpurea* in the baste solution is approximately 0.16% by weight.

5. A process for making a chew toy comprising the steps of mixing *Echinacea purpurea* with a baste solution; and applying the mixed *Echinacea purpurea* and the baste solution on rawhide.

6. The process of claim 5, wherein the *Echinacea purpurea* is mixed with the baste solution, the *Echinacea purpurea* having a concentration of between 0.01% and 10% with the baste solution.

\* \* \* \* \*